United States Patent [19]

Feldman

[11] Patent Number: 5,058,054
[45] Date of Patent: Oct. 15, 1991

[54] DATA TRANSMISSION DEVICE FOR INTERFACING BETWEEN A FIRST RATE DATA ACQUISITION SYSTEM AND A SECOND RATE DATA PROCESSING SYSTEM

[75] Inventor: Stuart M. Feldman, Beverly, Mass.

[73] Assignee: Analogic Corporation, Peabody, Mass.

[21] Appl. No.: 475,784

[22] Filed: Feb. 6, 1990

[51] Int. Cl.$^5$ ............... G06F 3/00; G06F 13/00; G06F 5/06
[52] U.S. Cl. ............... 364/900; 364/927.95; 364/927.96; 364/927.97; 364/927.98; 364/932.8; 364/934; 364/934.3; 364/935; 364/935.2; 364/239; 364/239.1; 364/239.9; 364/241.9; 364/260; 364/260.3
[58] Field of Search ............... 364/200, 900

[56] References Cited

U.S. PATENT DOCUMENTS

| | | | |
|---|---|---|---|
| 3,696,338 | 10/1972 | Preiss | 364/200 |
| 3,980,993 | 9/1976 | Bredart et al. | 364/200 |
| 4,121,217 | 10/1978 | Chen | 370/1 |
| 4,143,418 | 3/1979 | Hodge et al. | 364/200 |
| 4,209,841 | 6/1980 | Bambara et al. | 364/200 |
| 4,607,345 | 8/1986 | Mehta | 364/900 |
| 4,649,512 | 3/1987 | Nukiyama | 364/900 |
| 4,931,924 | 6/1990 | Kageura | 364/200 |

Primary Examiner—Thomas C. Lee
Assistant Examiner—Krisna Lim
Attorney, Agent, or Firm—Toby H. Kusmer

[57] ABSTRACT

An interface device is connected between a data acquisition system and data processing system. The interface device permits the data acquisition system to transmit data at a data transmission rate determined by the data acquisition system, and the data processing system to accept the data in byte sizes and rates compatible with the data processing system.

6 Claims, 1 Drawing Sheet

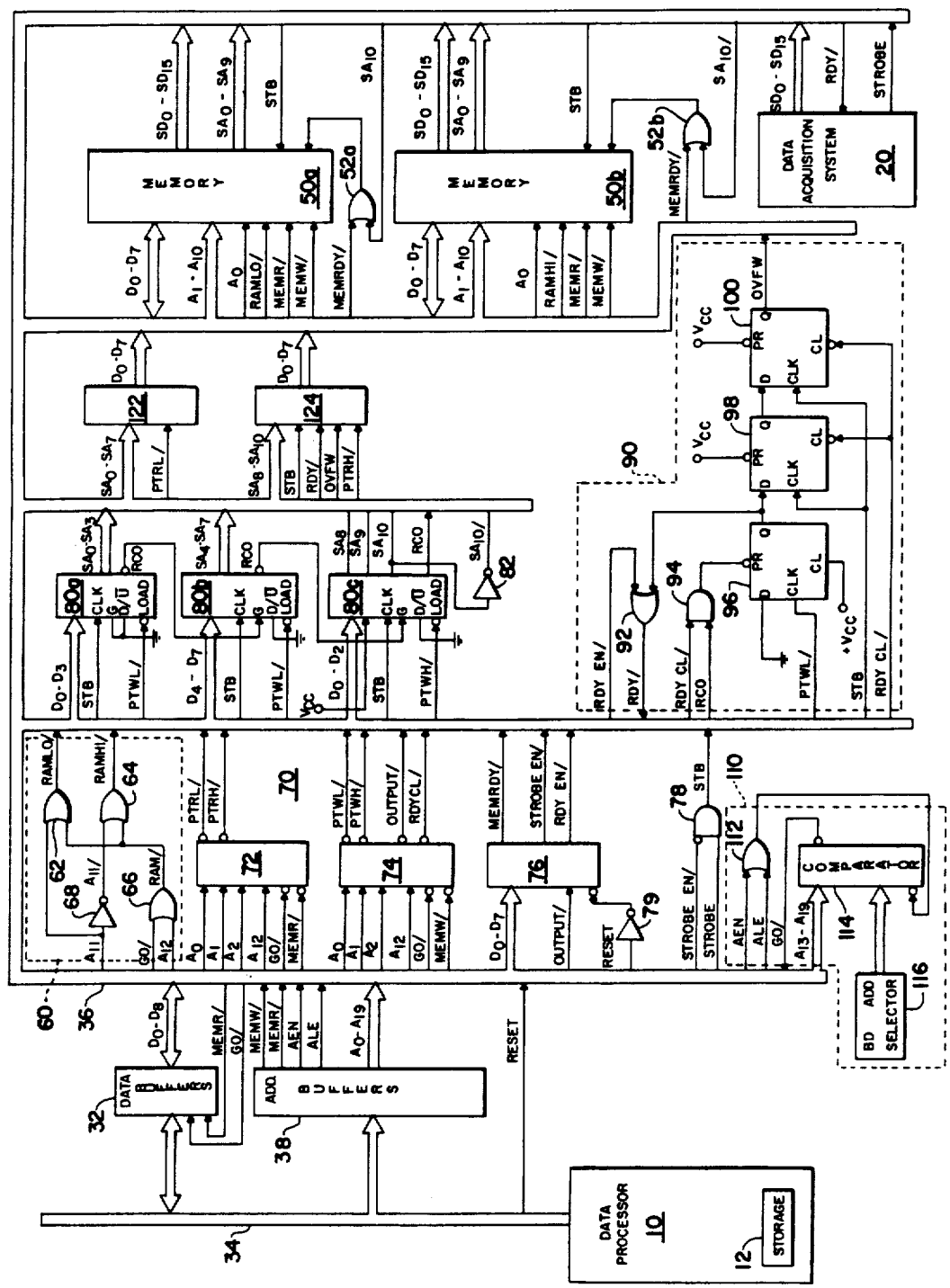

DATA TRANSMISSION DEVICE FOR INTERFACING BETWEEN A FIRST RATE DATA ACQUISITION SYSTEM AND A SECOND RATE DATA PROCESSING SYSTEM

BACKGROUND OF THE INVENTION

The present relates generally to an interface device, and more particularly to a device for interfacing between a data acquisition system operating at a first data transmission rate and a data processing system operating at a second and slower data transmission rate so that sets of data can be transferred from the data acquisition system at the first rate and accepted by the data processing system at the second rate.

It is often desirable to use microprocessor computing systems, such as PCs, XTs and ATs, with systems which acquire sets of data, such as spectrometers, so that the data can be easily processed as it is acquired. A frequent problem, however, is interfacing between the two systems since they often operate at different rates of transmission, with the data acquisition system usually acquiring the sets of data at a much faster speed (and often as larger sized words of data) than that at which the computing system can accept the data. The typical solution is to transmit and accept the data at the slower transmission rate in order to insure that data is not lost. However, this process tends to tie up the data acquisition system for an unnecessarily long time as data is being transferred to the data processing system.

OBJECTS AND SUMMARY OF THE INVENTION

It is a general object of the present invention to substantially overcome or reduce the problems of the prior art.

It is another object of the present invention to provide an improved interface device which allows the data acquisition system to transmit each set of data and the data processing system to accept each set of data, each at its own rate.

These and other objects of the present invention are achieved by an improved device for interfacing between a data acquisition system operating at a first operating data rate and a data processing system operating at a second and slower operating data rate so that sets of data can be transferred from the data acquisition system at the first operating rate and accepted by the data processing system at the second operating speed. The device comprising:

receiving means for receiving each of the sets of data from the data acquisition system;

transmission means for transmitting each of the sets of data to the second system; and data storage memory, coupled to the receiving means and the transmission means, the storage memory including a port for receiving each set of data from the data acquisition system through the receiving means at the first operating rate, means for storing the set of data, and a port for transmitting the stored set of data to the data processing system through the transmission means at the second data rate.

Other objects of the invention will in part be obvious and will in part appear hereinafter. The invention accordingly comprises the apparatus possessing the construction, combination of elements, and arrangement of parts exemplified in the following detailed disclosure, and the scope of the application of which will be indicated in the claims.

For a fuller understanding of the nature and objects of the present invention, reference should be had to the following detailed description taken in connection with the accompanying drawing wherein:

BRIEF DESCRIPTION OF THE DRAWING

The FIGURE is a schematic drawing of the preferred embodiment of the present invention.

DETAILED DESCRIPTION OF THE DRAWING

In the drawing the same numerals are used to identify identical parts.

As shown in the drawing the data processing system is indicated generally at 10 and includes a data storage memory 12, while the data acquisition system is generally indicated at 20. Systems 10 and 20 are respectively connected to the opposite inputs of an interface device 30 designed to incorporate the present invention. In the embodiment shown, device 30 is specifically adapted for use with a personal computer, such as the model AT or its equivalent, and a spectrometer manufactured by the present assignee, Analogic Corporation of Peabody, Mass., Model AN 9000. It should be understood, however, that the invention has many other applications and should not be construed to be limited to the application described.

In this particular application of the present invention, the data provided by the data acquisition system 20, the spectrometer, is a sixteen-bit signal, indicated as SD0-SD15, provided at a rate of 20 MHz under a standard format known as RS422. In the particular example, the spectrometer is adapted to acquire for each set of data, 2000 words of data of sixteen-bits each. The data processing system 10, i.e., the AT personal computer, however, processes data in eight-bit bytes at a rate of 4 MHz. Accordingly, the interface device 30 is adapted to receive and temporarily store the 2000 sixteen-bit words of data at the 20 MHz rate, and subsequently transmit the set of data to the data processing system 10 in eight-bit bytes at the 4 MHz rate.

Interface device 30 includes data bus buffers 32 connected between the data processing system bus 34 and the interface bus 36 of the device 30, so that eight-bit bytes D0-D7 of data can be transmitted from the interface bus 36 to the data processing system bus 34. Device 30 also includes address buffers 38 having inputs connected directly to the data processing bus 34 and its outputs connected to the interface bus 36. Address buffers provide various address command signals, MEMW/, MEMR/, AEN, ALE and the signals A0-A19, each in response to signals provided by the data processing system over the bus 34. A RESET signal is also provided by the data processing system 10 through the bus 34, directly to the bus 36.

The data acquisition system 20 has its sixteen-bit data output D0-D15 connected to the interface bus 36 so that each set of data provided by the system 20 can be transmitted to the interface device 30. The system also generates a clocking signal STROBE over the bus 36 at the data transmission rate of 20 MHz in response to a RDY/ signal generated by the device 30 in response to a command signal received from the system 10.

The device 30 further includes temporary memory 50, which in the example is preferably a two port memory having at least 2000 separately addressable locations defined by the address signals SA0-SA10, each for storing a sixteen-bit word received through one port from the data acquisition system 20, and adapted to transmit each 16-bit word as determined by the address signal A1–A10 as two sequential eight-bit bytes at the slower rate of the system 10 provided on the line A0. Because of the limitations on the availability of memory, for economy purposes two memory chips 50a and 50b, each having the capacity to store 1000 sixteen bit words (1024 to be exact), are used together to provide the necessary memory for storing the complete set of data received from data acquisition system 20. OR gates 52, functioning as negative AND gates, are used to toggle between the two chips, so that the inputs SD0–SD15 and SA0–SA9 of only one memory chip 50a are enabled at a time, with the first chip 50a receiving the first half of the data from the data acquisition system 30. Both OR gates 52 receive the MEMRDY/ signal generated in response to the data processing system 10 when there is no data currently stored in the memory 50 which needs to be transferred to system 10. The OR gate 52 which is enabled when the MEMRDY/ line is low will depend on whether the SA10 line or the SA10/ line is low, as described hereinafter. The data outputs D0–D7 and address inputs A0–A10 of chips 50a and 50b are respectively enabled by the RAMLO/ and RAMHI/ signals described hereinafter, which are also mutually exclusive high and low signals. Eight-bit bytes of data are read out the D0–D7 outputs from the address locations A0–A10 so long as the MEMR/ signal is present. Data can be written into the memory chips through ports D0–D7 if instead the MEMW/ signal is present. The remaining portion of the device 30 is adapted to control the flow of data from the data acquisition system 20 into the memory 50, and to control the flow of data from the memory to the data processing system 10.

More specifically, the device 30 includes a memory address decoder section 60, including OR gates 62 and 64, each connected to operate as negative AND gates, for controlling which of the two chips 50a and 50b are enabled during the writing of data from the data acquisition system 20 and the reading of data from the chips to the data processing system 10. The OR gates 62 and 64 receive a RAM/ signal from the OR gate 66, which in turn receives its input signals A12 from the data acquisition system 10 through the address buffers 38 and the GO/ from the address comparator 114, described hereinafter. The A11 signal, also provided from the system 10 through the buffers 38, is connected directly to the input of OR gate 62, and through the inverter 68 to the input of OR gate 64. The output of OR gate 62, RAMLO/, enables the chip 50a so that data can be read from and written into memory 50 over the data lines D0–D7, at the locations determined by address lines A0–A10, while the output of OR gate 64, RAMHI/ enables the chip 50b in the same manner. However, by virtue of the inversion of the A11 signal only one chip will be enabled at any one time.

The device 30 also includes output control unit 70, including control registers 72, 74 and 76, for receiving control signals from the data processing system 10 through the buffers 38 and for generating control signals for the interface device 30. Specifically, register 72 provides the high and low read pointer signals, PTRH/ and PTRL/, when the A12 and MEMR/ signals are provided by data processing system 10, through buffers 38, the GO/ signal is provided by the address comparator 114 (described hereinafter) and the appropriate address is provided over A0–A2. Similarly, register 74 provides the high and low write pointer signals, PTWH/ and PRWL/; when the A12 and MEMW/ signals are provided by data processing system 10, through buffers 38; the GO/ signal is provided by the address comparator 114; and the appropriate address signal is provided over A0–A2. Register 74 also provides the clocking signal OUTPUT and the RDYCL/ signal. Register 76 provides the enabling signal MEMRDY/, STROBE EN/ and RDY EN/. The enable signals are provided when system 10 is ready so that data can be written into memory 50 and read from memory 50 into storage 12. The AND gate 78 is used to generate the STB clocking signal at the same rate as the STROBE signal generated by the system 20 when gate 78 is enabled by the STROBE EN/ signal from the register 76.

The device 30 also includes a memory address bus control section including the memory address counters 80a, 80b and 80c for generating the necessary addresses to each of the memory chips 50a and 50b so that all of the data of the set transmitted by the system 20 to device 30 is stored at the corresponding address locations in the chips. In the example given, the counters are provided so as to a provide a consecutive count of at least 2000 counts, one for each location in memory 50. As such the outputs representative of the 2000 possible counts is an eleven bit signal (with 2048 possibilities). The counters may be set to increment or decrement. As shown the counters are set to decrement. An initial offset value is provided on the D0–D7 lines from the data processing system 10 and loaded into the registers when the low and high write pointer signals PTWL/ and PTWH/ are provided at the load input of the counters 80 as shown from the registers 72 and 74 of the output control unit 70 in response to signals received from the data processing system 10. The offset values are loaded into the counters 80 before the count begins so that the counter 80c provides a change on the SA10 line and a ripple carry out signal, RCO, when the first chip 50a is filled with data and data is then to be loaded into the chip 50b. By setting the initial count at 1000 above the value where SA10, the most significant bit, changes state, when the counters are decremented for a count of 1000 (decrementing the counters with the STB signal one count at a time), the S10 line will change state when the counters 80 have been clocked and the address outputs of the counters have changed 1000 times. This will disable chip 50a and enable chip 50b. The counters will continue to decrement, counting 1000 addresses on the address lines SA0–SA9 applied to the enabled chip 50b. The counters will continue to decrement so long as it continues to receive the STB clocking signal. However, as will be more evident hereinafter, the data acquisition system 20 is designed to stop sending the STROBE signal when a complete set of data has been transmitted from the system and written into memory 50. This results in the STROBE input to gate 78 disabling the gate so that the clocking signal STB will no longer be generated. Means are preferably provided to insure that the counter is continuing to provide address signals to the memory 50 after a set of data has been written into memory.

More specifically, the device 30 also includes a ready and overflow control section 90 for providing an indication to the data processing system 10 that the counters are continuing to provide addresses to the memory 50 when the count corresponding to all of the locations of memory are complete, and a complete set of data is stored in memory. As shown the section 90 includes an OR gate 92 connected to operate as a negative AND gate for providing the RDY/ signal to the bus 34 when both its inputs are low indicating to the data acquisition system 20 that the device 30 is ready to receive a set of data. Change of the signal status will result in the system 20 being disabled from sending further data to the device 30. Control section 90 also includes AND gate 94 for providing a signal to the power input of a first D-type flip-flop 96 when the output of the AND gate 94 is low, which occurs when the counter has completed its second count indicating that both chips 50a and 50b are full and the STROBE signal is withdrawn. The RCO signal changes state, when the SA10 signal changes state, after the chip 50a is filled with data, before the chip 50b starts receiving data. However, the RDYCL/ line (connected to the output of register 74 so that the signal RDYCL/ is received by the AND gate 94 from the register 74 in response to a signal generated by the data processing system) will remain high preventing the output of AND gate 94 from going low until the chip 50b is filled and the RDYCL/ line changes state from a high state to a low state. The Q output of the first flip-flop 96 is connected to the D input of a second flip-flop 98, which in turn has its Q output connected to the D input of a third flip-flop 100. The latter two flip-flops are clocked by the STB signal and cleared by the RDYCL/ signal derived from the data processing system 10 and described hereinafter. Flip-flop 100 provides an overflow signal OVFW to the bus 34 indicating that the counters have exceeded the predetermined count and that all of the memory locations are filled.

Finally, in order to read data from the memory 50 into the data processing system 10, a board address decoder 110 is provided so as to establish the correspondence between the memory addresses of the memory 50 and the corresponding memory storage 12 of the data processing system 10 where the data is to be stored. More specifically, an OR gate 112 receives enabling signals from the data processing system 10, through the address buffers 38, when the data processing system is ready to receive data from the memory 50. The enabling signal output of gate 112 is applied to an enabling input of an address comparator 114. One input of comparator 114 is adapted to receive each address location of the data processing system ready to receive the a byte of data from the memory 50, and the other input is adapted to receive an input from a board address selector 116, in which the first address of the data processing system is set to correspond to the first address of memory 50 from which data is to be read. The output signal GO/ of the comparator indicates the commencement of the reading of data from the first storage location from memory 50.

In addition, memory address bus buffers 122 and 124 are provided for the transfer of the addresses SA0–SA10, as well as the status of bits STB, RDY/ and OVFW. Buffer 122 is active when the PTRL/ bit is low, while buffer 124 is active when the PTRH/ bit is low. Accordingly, buffer has SA0–SA7 connected to its eight inputs, while its eight outputs are connected to the output lines D0–D7, so that these eight bits can be read through the data bus buffer 32 to the bus 34 so that it can be stored in memory storage 12. The next interval, the SA8–SA10 bits are similarly provided over lines D0–D2 so that a complete address is provided, as well as the status of lines STB, RDY/ and OVFW are checked on lines D3–D5 to be sure that no problems are occurring.

In operation, the data acquisition system 20 collects a set of data, and when it is ready to transmit data, it transmits the STROBE signal over the bus 36 to one input of the AND gate 78 and looks for the RDY/ signal provided from the device 30. When the data processing system 10 is ready to receive data it provides an initial RESET signal directly through inverter 79 to register 76 so that the latter is cleared. This causes the MEMRDY/, STROBE EN/ and RDY EN/ lines all to go low. During this interval the data processing system provides the necessary signals on lines A13–A19 to the address comparator 114 so that the GO/ will go low. In addition, the A12 line goes low so that the RAM/ low signal is provided from gate 66. The A11 line is low so that a low RAMLO/ signal is provided by gate 62 to the chip 50a while RAMHI/ remains high. Also during this interval, with the GO/ and MEMW/ lines low, and the lines A0–A2 appropriately addressed, register 74 will now be enabled so that the PTWL/ and PTWH/ lines go low, while the RDYCL/ and OUTPUT/ lines stay high. Finally, during this interval the MEMW/ line goes low.

As a result of this initial set up the memory 50 will be ready to receive data from the system 20 because the RAMLO/ and MEMW/ are low, and the MEMRDY/ signal input to the OR gates 52 is low. Additionally, the STROBE EN/ signal enables the AND gate 78, and with the presence of the clocking STROBE signal received from the data acquisition system 20, the STB signal will begin. In addition the RDY EN/ signal is applied to the gate 92, so that the RDY/ line goes low informing the system 20 to begin transmitting data. In this regard the RDY/ and STROBE signals a "handshake" feature, i.e., for enabling the interface device 30 with a signal derived from the data processing system 10 and a clocking signal received from the data acquisition system 20 so as to generate a clocking signal STB at the rate set by the data acquisition system so that data is received and stored by the memory 50 at that rate only when the system 20 is ready to transmit data and system 10 is ready to receive it and at a rate set by the data acquisition system.

During the initial set up, the MEMR/ line is temporarily set low so that the data buffers 32 are enabled so that the offset value for the counters 80 is provided over the D0–D7 lines to the counters. With the PTWL/ and PRWH/ signals applied to the counters 80a, 80b and 80c, the initial offset count is loaded into the counters and read out with the first STB count from the AND gate 78. As indicated above, the initial count is such that the SA10 line will be high so that gate 52a will provide an enabling signal to the chip 50a since the latter is ready to write data by virtue of the presence of MEMW/ and the RAMLO/ signals, while the chip 50b will remain disabled.

As indicated the output of the registers 80a–80c is a ten bit address SA0–SA9 (providing a total of 1024 possible addresses) initially applied to the memory chip 50a. The initial preset number is such that the count in counters 80 will decrement one count at a time with each clocking signal STB so as to change the address of memory chip 50a for each sixteen-bit data word received from the system 20 over lines SD0–SD15, until it reaches a value where the line SA10 changes to a low signal (when the last data word is entered into memory chip 50a). At this count when the S10 line changes state, the outputs of the OR gates 52 change state resulting in the chip 50a becoming disabled and chip 50b becoming enabled to read data being transmitted from the system. In addition to changing the SA10 line, the RCO line will also change so that the output of gate 94 goes low and a signal is applied to the power terminal of flip-flop 96. However, the latter will not change state until a positive transition is provided on the line PTWL/ (when the write cycle is completed). Thus, the change in gate 94 will have no effect on the ready and overflow control section 90. However, once the count reaches the preset amount, and all of the remaining data is transferred to the memory chip 50b, the data acquisition system should stop transmitting the STROBE signal so as to disable gate 78, and prevent the clocking signal STB from being transmitted to the counters 80. During the write cycle, the PTRL/ and PTRH/ signals are low, and as indicated earlier the MEMR/ signal is low so that the addresses provided by the data acquisition system, SA0-SA10 are provided in alternating readings by the data processing system on the lines D0-D7. In addition the status of the STB, RDY/, and OVFW lines are checked. In this way the system 10 will know when the Q output of flip flop 96 goes high (resulting in the RDY/ going high) and when the STB signal ceases to be transmitted. Specifically, the PTWL/ line goes high when the data has been transmitted, causing the Q output of flip flop 96 to go high and as a result the RDY/ to go high. This should be sensed by the system 20 to confirm that no data is to be sent to prevent new data from being written into memory 50 before the current data is read out.

In the event that the counters 80 continue to count, after the chip 50b receives all of the data from the system 20. The next STB pulse will clock flip flop 98 causing the Q output of the latter to go high, which should also change the status of line RDY/ to prevent the transmission of data. This will be sensed by the system 10 through the buffer 124. If the counters continue to receive a STB signal because the STROBE line has not changed, the next STB pulse will result in the OVFW signal being generated from flip flop 100.

Where the system 20 senses the high signal on the RDY/ line and no longer transmits the STROBE signal, the gate 78 will be disabled so that the STB signal will no longer be transmitted. In addition, system 10 now provides a high signal on the MEMW/ line and a low signal on the MEMR/ line so that the memory 50 is now enabled to read data out in eight bit bytes on the D0-D7 lines directly to the data buffers 32 at a clocking rate provided on the A0 line. The RAMLO/ and RAMHI/ lines are used to determine which of the chips is enabled. The data is not only read as eight bit bytes, the size of data which is acceptable by the data processing system 10, but also at a rate set by the system 10. The data is read directly into the storage 12 at addresses initially determined by the address selector 116.

The device 30 thus described, provides an improved interface device which allows the data acquisition system 20 to transmit each set of data and the data processing system to accept each set of data, each at its own operating speed and in bit sizes compatible with each system.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A device for interfacing between a data acquisition system comprising means for acquiring data in first sets, each of a first predetermined number of parallel bits at a first rate and a data processing system comprising means for processing data in second sets, each of a second predetermined number of parallel bits different from said first predetermined number at a second rate different from said first rate so that sets of data can be transferred from said data acquisition system at said first rate and accepted by said data processing system at said second rate, said device comprising:

receiving means for receiving in parallel each of said first sets of data from said data acquisition system at said first rate;

transmission means for transmitting in parallel each of said second sets of data to said data processing system at said second rate;

data storage memory, coupled to said receiving means and said transmission means, said storage memory including a first port for receiving in parallel each of said first sets of data from said data acquisition system through said receiving means at said first rate, means for storing each said first set of data, and a second port for transmitting said stored first set of data to said data processing system through said transmission means at said second rate; and means, responsive to a first signal from said data acquisition system indicating that said data acquisition system is ready to transmit a first set of data and a second signal from said data processing system indicating that said data processing system is ready to receive a second set of data, for enabling said data storage means so that said data storage memory can receive and store a first set of data from said data acquisition system through said receiving means only in response to both of said first and second signals.

2. A device according to claim 1, wherein said means for enabling said data storage memory generates a strobe signal at a frequency equal to the operating speed of said data acquisition system in response to said first and second signals.

3. A device according to claim 1, further including address generating means for generating a predetermined number of addresses of said data storage memory as each of said first sets of data is transmitted from said data acquisition system, and means for indicating when said address generating means generates addresses in excess of said predetermined number of addresses.

4. A device according to claim 3, wherein said data acquisition system acquires data in word lengths of said first predetermined number of bits, said data processing system processes data in bytes of said second predetermined number, and said data storage memory stores each of said words of data from said data acquisition system in one or more memory locations, each of said locations being sized so as to store each of said bytes of said second predetermined number of bits.

5. A device according to claim 4, wherein first predetermined number of bits is larger than said second predetermined number, said device further including means for dividing each of said words of said first predetermined number into the equivalent number of bytes of said second predetermined number prior to storing said data in said data storage means so that each of said words stored in said data storage means can be transmitted to said data processing means in the equivalent number of bytes.

6. A device according to claim 1, wherein said data in said data storage means is accessible by said data processing means on demand.

* * * * *

UNITED STATES PATENT AND TRADEMARK OFFICE
CERTIFICATE OF CORRECTION

PATENT NO. : 5,058,054

DATED : October 15, 1991

INVENTOR(S) : Stuart M. Feldman

It is certified that error appears in the above-identified patent and that said Letters Patent is hereby corrected as shown below:

Claim 5, column 8, line 56, after "wherein" insert --said--.

Signed and Sealed this

Twentieth Day of April, 1993

Attest:

MICHAEL K. KIRK

*Attesting Officer*      Acting Commissioner of Patents and Trademarks